United States Patent [19]

Evertsen

[11] Patent Number: 4,881,332

[45] Date of Patent: Nov. 21, 1989

[54] SHOVEL LIFTING AID

[76] Inventor: Gary L. Evertsen, 4627 Porter Ave., Ogden, Utah 84403

[21] Appl. No.: 196,251

[22] Filed: May 20, 1988

[51] Int. Cl.$^4$ .............................................. E01H 5/02
[52] U.S. Cl. ...................................... 37/285; 294/54.5
[58] Field of Search ......................... 37/285, 284, 278; 294/54.5

[56] References Cited

U.S. PATENT DOCUMENTS

| | | | |
|---|---|---|---|
| 2,846,785 | 8/1958 | Underwood | 294/54.5 X |
| 3,035,816 | 5/1962 | Conant | 294/54.5 X |
| 3,119,596 | 1/1964 | Pratt | 294/54.5 X |
| 3,748,761 | 7/1973 | Chetwynde | 294/54.5 X |
| 3,751,094 | 8/1973 | Bohler | 294/54.5 X |
| 4,103,954 | 8/1978 | Vaslas | 294/54.5 |

Primary Examiner—Edgar S. Burr
Assistant Examiner—Moshe I. Cohen
Attorney, Agent, or Firm—A. Ray Osburn

[57] ABSTRACT

An attachment for a shovel or similar tool relieving the worker of the back muscle and vertebral strain normally attendant with shoveling. The shovel aid features an elongate stem pivotally attached to the shovel handle, so that the material being shoveled may be loaded upon the shovel head, lifted, and carried sideways to be deposited, all without lifting forces upon the shovel by the hands, and without curvature of the back and spine. The shovel lifting aid may be used also with snow shovels, hoes and the like.

10 Claims, 6 Drawing Sheets

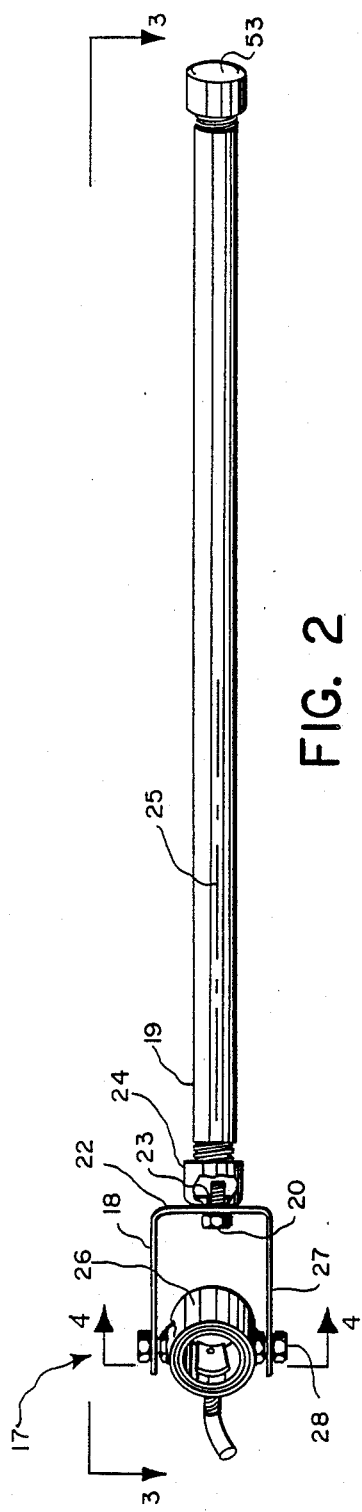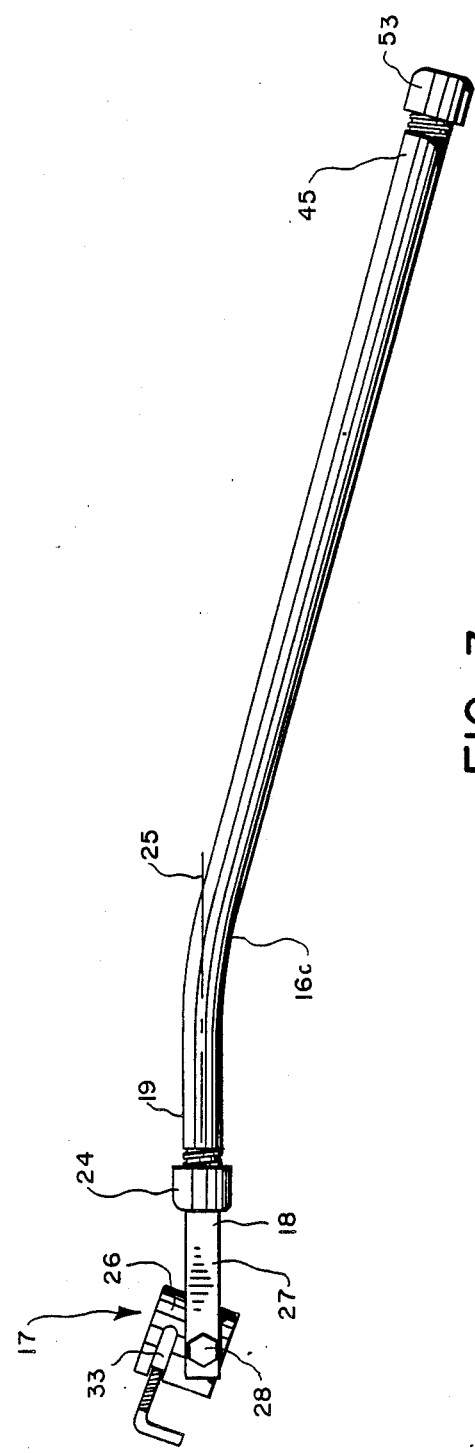

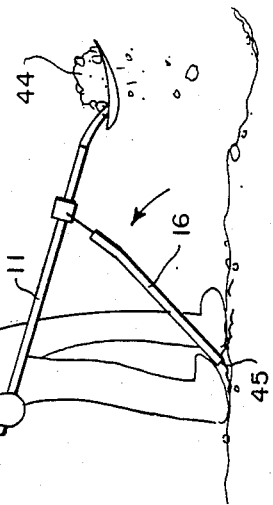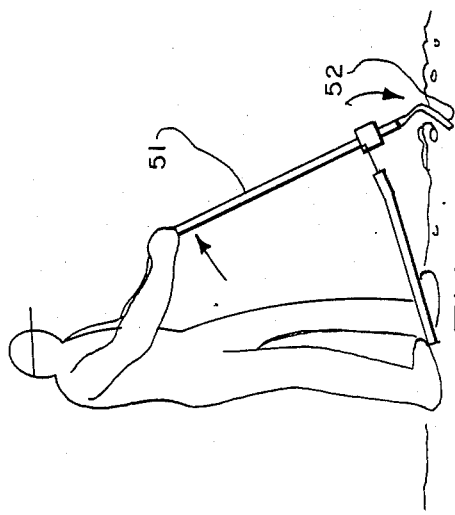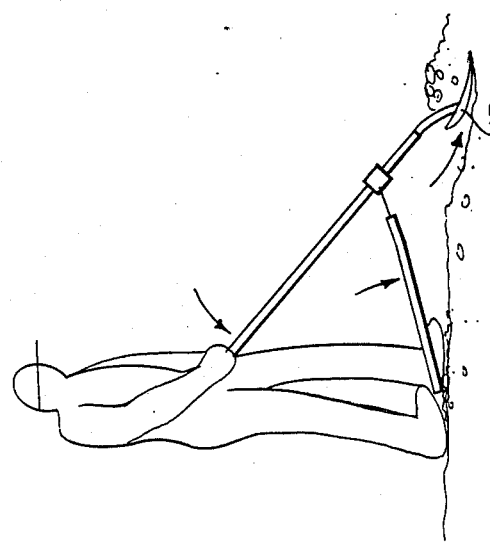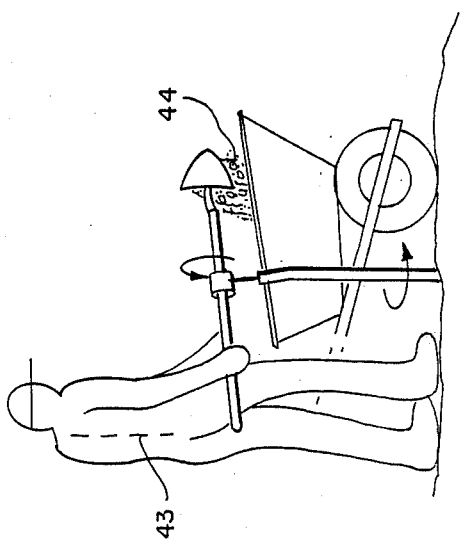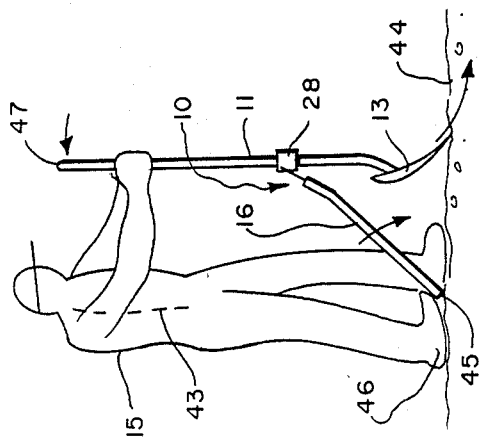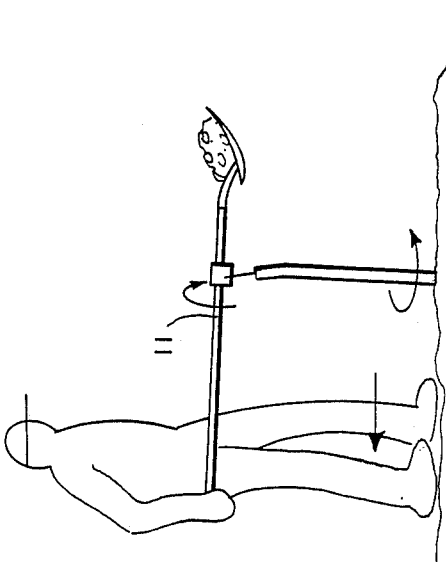

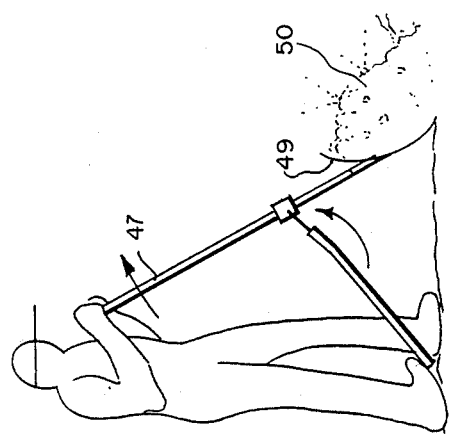
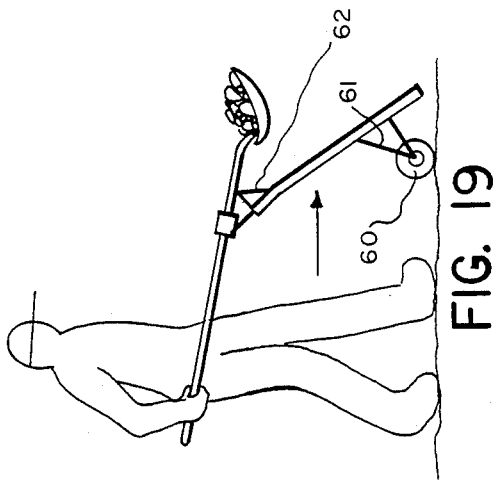
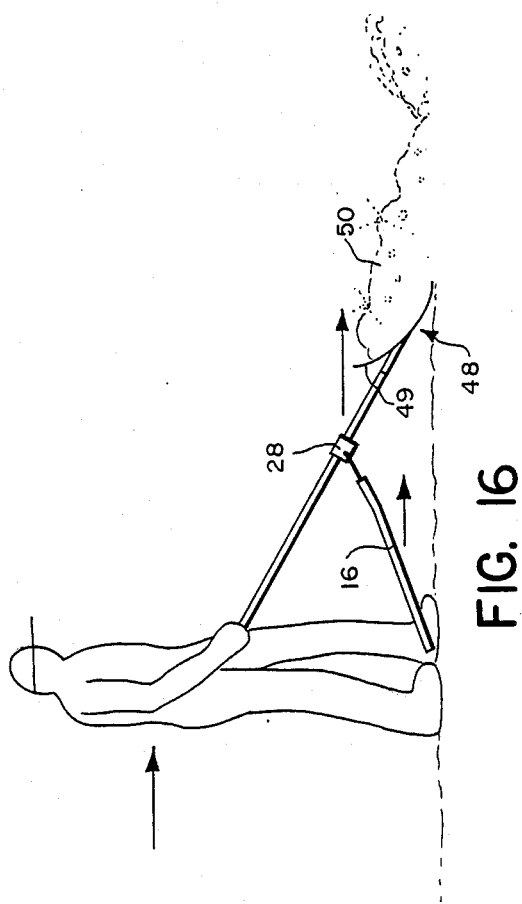
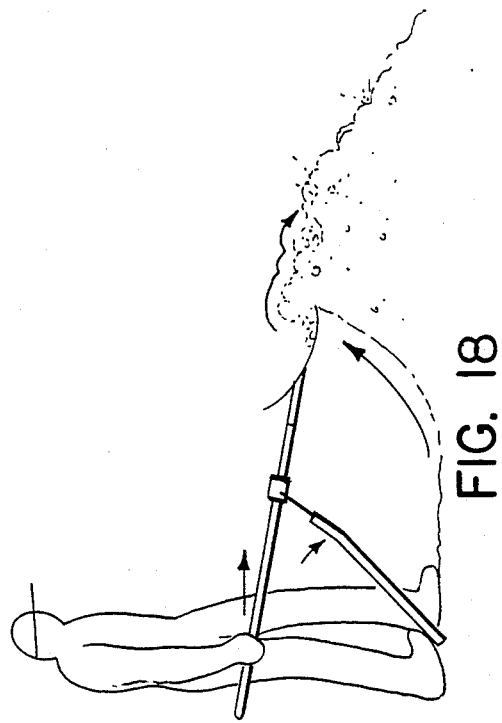

SHOVEL LIFTING AID

BACKGROUND OF THE INVENTION

1. Field

The field of the invention is devices for use with manual tools for handling such materials as soil, sand and snow, and more particularly such devices which are designed to relieve the tool user of severe muscle and joint stress and strain.

2. State of the Art

The use of spades, shovels, snow scoops and hoes for manipulating soil, sand or snow is notorious for strain upon spinal joints and back muscles. The weight of each shovel of material has to be resisted by the back acting as a cantilever, putting huge loads upon the muscles. The spine is stressed in compression and the muscles in tension to resist the bending of the back. Because the back is in any event normally bent to load and lift the shovel, the whole weight of the torso, shoulders, arms and head must also be borne by the back acting as a cantilever. The arms and shoulder skeletal parts and muscles are also stressed, but seldom give serious problems. Although the fatigue, soreness, and injury attendant with shovel work is a long-standing and well recognized problem, the inventor knows of no devices for providing relief, other than powered ditchers, scoops, backhoes, and the like. Powered equipment, however, is very often not available, or cannot be used where needed because of limited access and expense.

BRIEF SUMMARY OF THE INVENTION

With the foregoing in mind, the present invention eliminates or substantially alleviates the disadvantages and shortcomings in the prior art tools. The invention comprises an elongate, ground contacting member attached pivotally to an intermediate point along the handle of a shovel or similar tool. By manipulating the shovel handle pivotally atop the attached member, the worker is able to lift and place the soil without vertebral or back muscle strain. The lifting forces normally applied to the handle by the hands are reversed, becoming downward forces instead, with the attached member providing the necessary upward lifting forces. The handle is manipulated without bending of the shoveler's back and so eliminates virtually all of the usual spinal and muscle stress.

With the pivoted member, the shovel head may be loaded with soil by downward force on the end of the handle, causing the shovel head to scoop forwardly into the soil, with the attached member rotating both with respect to the handle and its lower, ground-contacting end. The loaded shovel is then raised to hip level by drawing and lowering the end of the handle, rotating the pivoted member back about its lower end into an upright position. Preferably, the attached member is in length approximately the distance from the ground to the hips of the worker. To permit the shovel head to be moved sideways to deposit the load where desired, the ground end of the pivoted member is preferably rotatable about its length with respect to the ground so that the worker may rotate the shovel and attached member together. According to one variation of the invention, the ground-contacting end of the pivoted member is rotated directly upon the ground. According to another variation, a ground-gripping shoe is applied to which the ground end of the pivoted member is rotatably secured. To facilitate unloading the shovel head, the shovel handle is preferably mounted to be freely rotatable about its own longitudinal axis upon the pivoted member.

It is therefore the object of the invention to provide an accessory for material handling manual tools which substantially relieves the strain upon the spinal vertebrae and the associated back muscles of the worker.

BRIEF DESCRIPTION OF THE DRAWINGS

In the drawings, which represents the best mode presently contemplated for carrying out the invention, FIG. 19 is a diagrammatic representation of the snow shovel being used in conjunction with a stem and a pair of wheels so as to permit the snow to be easily moved.

DETAILED DESCRIPTION OF ILLUSTRATED EMBODIMENTS

Figure 1:
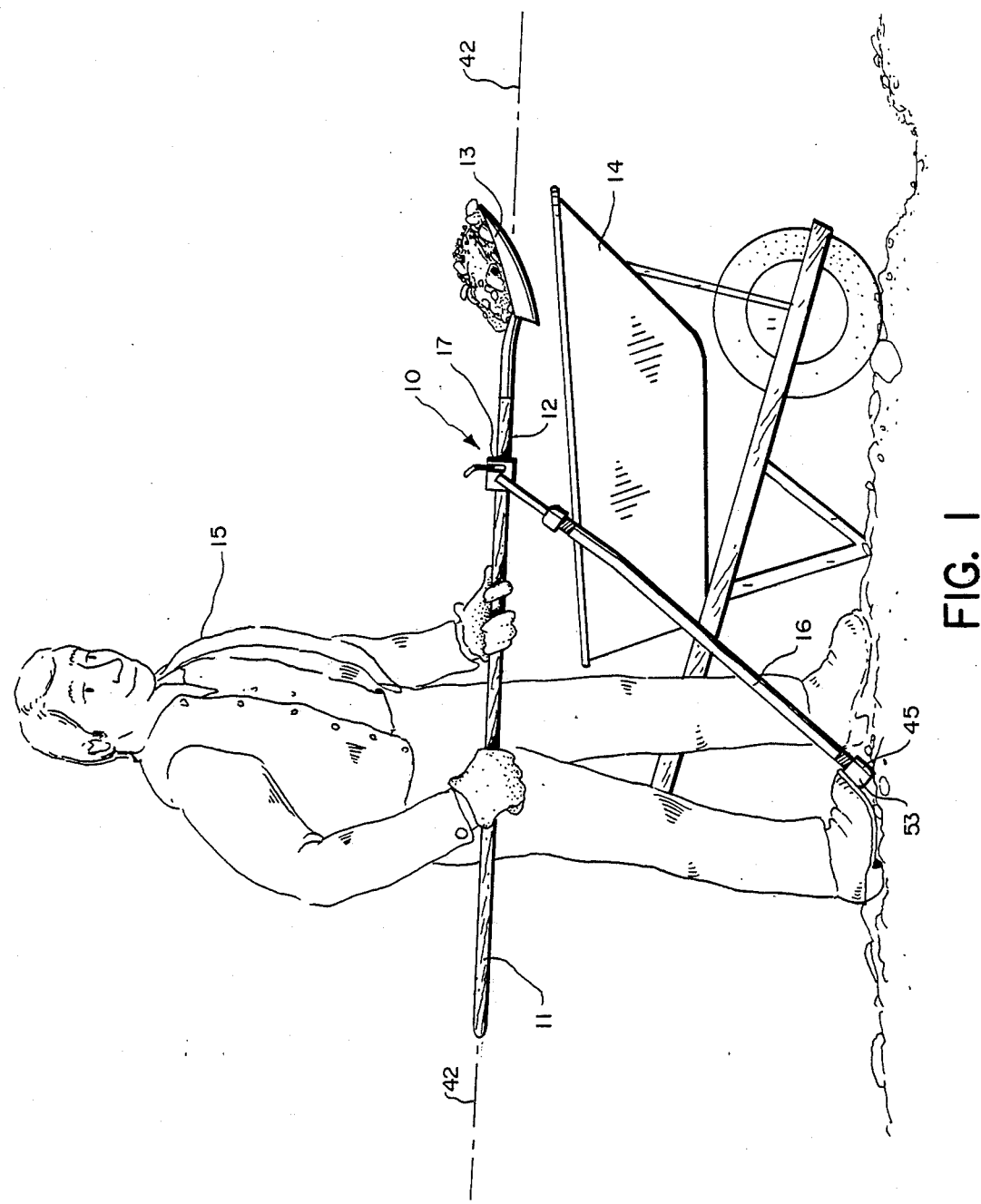
FIG. 1 is an elevation view of a shovel lifting aid in accordance with the invention shown in use by a shoveler, drawn to a reduced scale, FIG. 2 a view of the shovel aid of FIG. 1, taken along line 2—2 thereof, drawn to a somewhat larger scale than that of FIG. 1, FIG. 3 a view of the shovel aid of FIG. 2, taken along line 3—3 thereof, drawn to the same scale, FIG. 4 a view of a fragment of the shovel lifting aid of FIG. 3, showing the tool handle connection means, drawn to approximately full scale, FIG. 5 a view of the fragment of FIG. 4, taken along line 5—5 thereof, drawn to the same scale, FIG. 6 a cross sectional view of the handle connection means of FIG. 5, taken along line 6-6 thereof, shown with a tool handle clamped therein, drawn to the same scale as FIG. 5, FIG. 7 an elevation view of a fragment of an alternate construction for the ground-contacting end of a shovel lifting aid in accordance with the invention, wherein a ground-gripping shoe is provided along with a universal type connector between the stem and the shoe, drawn to approximately the scale of FIG. 2, FIG. 8 another construction for the ground-contacting end of a shovel lifting aid in accordance with the invention, incorporating a ground-gripping shoe and attachment means joining the shoe and the stem comprising a clevis arrangement, drawn to the scale of FIG. 7, FIG. 9 a diagrammatic representation of a worker using a shovel without the inventive lifting aid, indicating the stress generating, bent back posture, drawn to a smaller scale than FIG. 1, FIG. 10 a diagrammatic representation of a worker in starting position for shoveling with the use of the shovel lifting aid, drawn to the scale of FIG. 9, FIG. 11 a diagrammatic representation showing the shovel laden with soil upon its head, drawn to the same scale as FIG. 10, FIG. 12 a diagrammatic representation of the shovel aid in an intermediate position lifting the soil upwardly from the ground, drawn to the scale of FIG. 11, FIG. 13 a diagrammatic representation of the shovel aid in use, the laden head being lifted to approximately hip height, drawn to the scale of FIG. 10, FIG. 14 a diagrammatic representation of the loaded shovel being unloaded unloaded into a wheelbarrow, drawn to the scale of FIG. 10, FIG. 15 a diagrammatic representation of the shovel aid being utilized in conjunction with a hoe, drawn to the scale of FIG. 10, FIG. 16 a diagrammatic representation of the shovel aid being used in conjunction with a snow shovel being used in a bulldozing fashion, drawn to the scale of FIG. 10, FIG. 17 a diagrammatic representation of the shovel aid being positioned to lift the loaded snow shovel to deposit the snow, drawn to the scale of FIG. 10, FIG. 18 a diagrammatic representation of the snow shovel being unloaded, drawn to the scale of FIG. 10.
Figure 4:
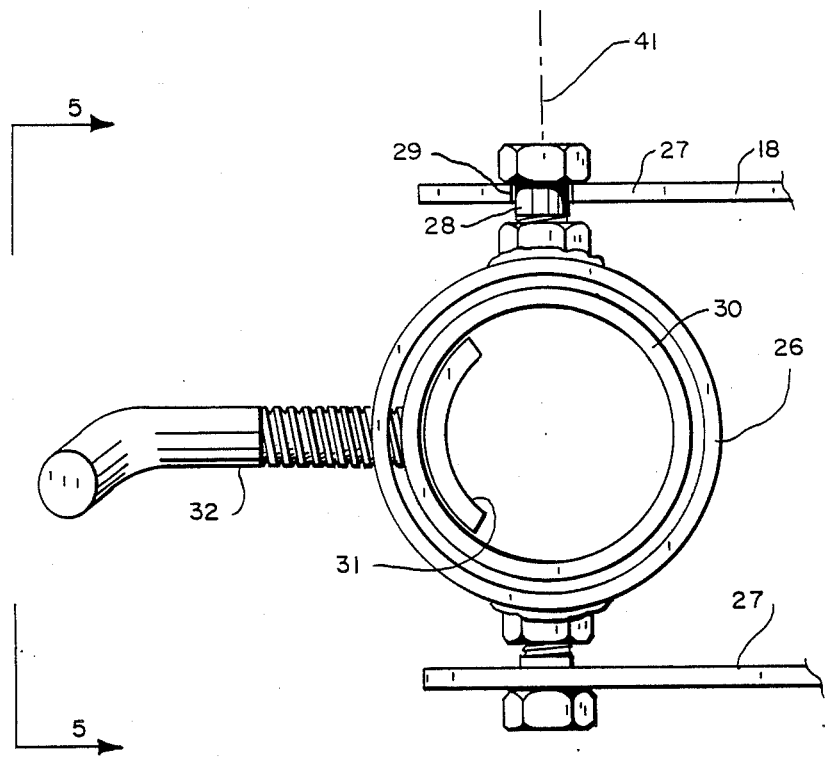
Figure 5:
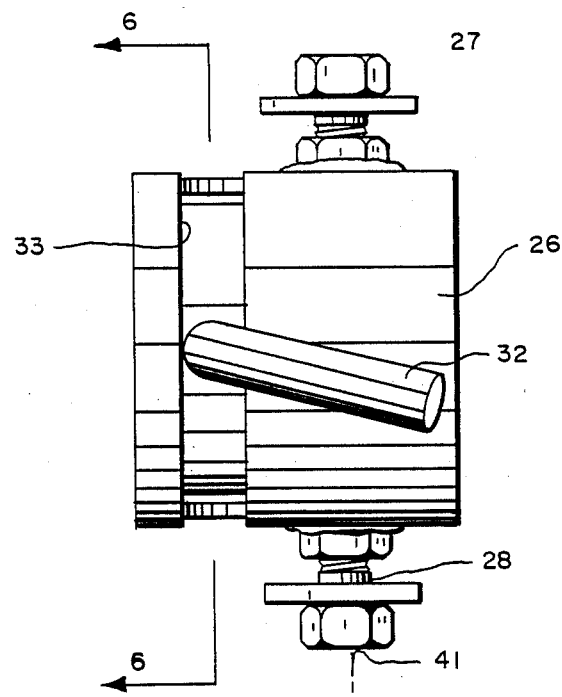
Figure 6:
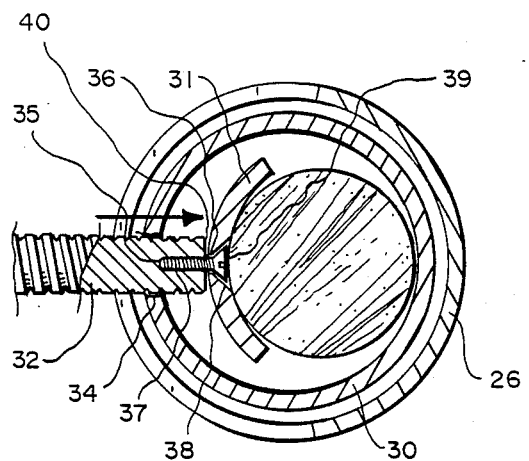

In FIG. 1, lifting aid 10 is shown in use attached to the handle 11 of a shovel 12. Shovel 12, with soil laden head 13, is shown in a typical intermediate position during lifting of the soil from the ground into a wheelbarrow 14, for example. The back and torso of the shoveler 15 are in normal upright position. As later explained in detail, the back of the shoveler need never be bent at any time when shovel aid 10 is used.

Shovel lifting aid 10 comprises an elongate, preferably tubular, stem 16, to one end of which is secured a pivot handle attachment mechanism 17. Curved portion 16c enables stem 16 to be folded compactly against handle 11 for storage. (FIGS. 1-5) Pivoting device 17 comprises a clevis 18 secured to upper end 19 of stem 16. A clevis bolt 20 extends through a bore 21 in clevis cross member 22, engaging threaded bore 23 in stem upper end cap 24. In this illustrated embodiment, clevis bolt 20 is tightened to prevent rotation of clevis 18 about longitudinal axis 25 of stem 16. A cylindrical sleeve 26 is secured pivotally between the arms 27 of clevis 18 through a pair of axially aligned pivot pins 28. Pins 28 engage bores 29 carried by arms 27.

Loosely contained within sleeve 26 is an inside sleeve 30, within which handle 11 is held by an arcuate clamp member 31. A manual set screw 32 extends through a circumferential slot 33 in outside sleeve 26, and engages a threaded bore 34 in the wall of inside sleeve 30. Clamp mounting screw 35 extends through an unthreaded clamp bore 36, bottoming in threaded axial bore 37 in set screw 32, loosely retaining clamp member 31. A countersink 38 accepts head 39 of screw 35, so that the uninterrupted inside surface of clamp 31 is urged against handle 11 by shoulder 40 of set screw 32. Thus, shovel 12 may be pivoted about axis 41 of pins 38 perpendicularly to handle 11 and also rotated about longitudinal axis 42 of handle 11 with inside sleeve 30 turning within outside sleeve 26. Pivot connector 17 may be installed along handle 11 as desired by the individual shoveler 15. Attachment at a distance from head 13 of about one-third the length of handle 11 has proven effective for most shovelers.

Figure 9:
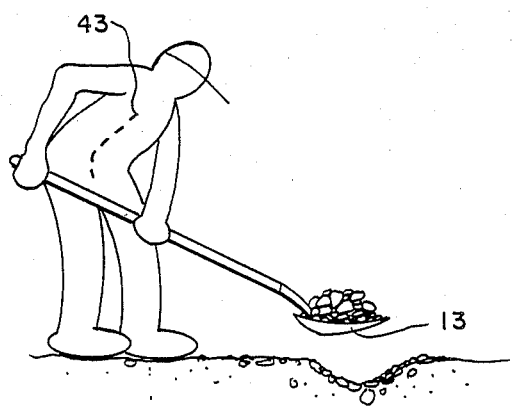

Shoveling is highly stressful to the spinal column and associated muscles of the back. The back must bend and straighten to normal upright position each time a load of material on shovel head 13 is lifted from ground level. (FIG. 9) To load shovel head 13, the back must be bent awkwardly forward, forcing spine 43 to curve concavely forward and downward. In this position, the spine 43 and associated muscles must resist the weight of both the loaded shovel head 13 and the torso of the body. Stress from the weight of the torso is probably the more significant of the two loads. These loads tend to bend the spine forward, so that they must be resisted by the back acting as a cantilevered beam. To lift the loaded shovel, the back muscles must act against this combined load to straighten spine 43. The weight of the loaded shovel must also be borne as a vertical column load on spine 43, in addition to the weight of the torso and upper body. The repeated stress and strain of back muscles and vertabrae is very severe. Shovel lifting aid 10, however, relieves the shoveler's body of such stress by rendering it unnecessary for his back to be bent while shoveling. (FIGS. 10-14)

With shovel aid 10, the spine 43 and back remain normally straight and vertical throughout the various positions of shovel 12 required during loading, lifting and unloading of the soil from head 13. In FIG. 10, head 13 is placed against soil 44 preparatory to loading. Lower end 45 of stem 16 is in contact with the ground. Shoveler 15 may stabilize lower end 45 on the ground with his foot 46. To load shovel head 13, shoveler 15 pulls the near end 47 of handle 11 downwardly, causing shovel 12 to rotate about pins 28 towards a lower, more horizontal position while stem 16 rotates about its ground end 45, so that shovel head 13 digs forwardly and downwardly into the soil 44. (FIG. 11) Stem 16 rotates about lower end 45 away from shoveler 15 to lie near the ground when shovel head 13 becomes fully loaded. The back and spine 43 of shoveler 15 remain normally upright and straight.

In FIG. 12, shoveler 15 has raised loaded shovel 12 to an intermediate position above the ground by pulling on shovel handle 11, rotating stem 16 about its ground end 45 back toward a vertical position. The back and spine 43 of shoveler 15 still remain normally upright and straight.

In FIG. 13, shoveler 15 has continued to pull shovel handle 11 towards himself until stem 16 is substantially vertical, and shovel 12 is horizontal and raised to hip height, still without curvature of his spine 43. Soil 44 may then be unloaded into a wheel barrow 14, for example, by rotating shovel 12 and stem 16 about ground contacting end 45 to move loaded heal 13 laterally to a position above barrow 14. A twist of handle 11 rotates shovel head 13 along with inside sleeve 34 to dump the load of soil 44. (FIG. 14)

The weight of the soil is borne at all times by stem 16, Soil 44 is loaded upon shovel head 13, elevated as necessary, transferred laterally to the place of deposit, and unloaded, with the back and spine 43 of the shoveler remaining at all times normally vertical and unbent. The normal upward lifting forces on handle 11 are replaced by opposite downward forces. The back, relieved of cantilever forces from the weight of the upper body and the soil 44, and further relieved of even the weight of the soil, is essentially unstressed.

If the soil is hard or too firmly packed, it may be necessary to use the foot to load shovel head 13. However, this does not significantly strain the back, and the subsequent steps described above may then be used.

Shovel lifting aid 10 may also be used effectively with snow shovels on driveways, for example. (FIGS. 16-18) Deep snow may of course be handled in the same way as described above for soil. For more shallow snow, shovel aid 10 co-operates very well with typical snow shovels 48. Arcuate blade 49 may be loaded with snow 50 by operating the shovel in a bulldozing manner, with stem 16 trailing loosely from pivot pins 28. (FIG. 16) When the edge of the driveway is reached, near end 47 of handle 13 is raised upwardly and forwardly, bringing stem 16 to a more vertical position. (FIG. 17) Then, blade 49 is simultaneously elevated and pushed forward by manipulation of end 47 of handle 13, with stem 16 rotating forwardly about ground contacting end 45.

(FIG. 18) In this manner, the snow 50 is bulldozed upwardly and forwardly over the deeper, piled snow 50 at the driveway edge. If desired, the snow 50 may instead be thrown a considerable distance from the driveway by an abrupt pull on handle 13, pivoting blade 48 sharply forward and upward to fling the snow. With either approach, the snow is manipulated without the normally attendant stresses and strains.

In FIG. 15, shovel aid 10 is shown used with a hoe 51. Hoe head 52 is forced into the soil by upward and forward manipulation of end 47 of handle 11. Lifting forces are required on handle 11, but bending of spine 43 is not, so that the back is relieved of the majority of the stress normally attendant to hoeing.

Preferably, lower end 45 of tubular stem 16 carries a cap 53 to prevent it from too deeply penetrating the ground. Cap 53 may be rounded to rotate on the ground in all directions as freely as possible. However, a more blunt configuration as illustrated is more easily stabilized by the foot 46 when necessary, and is felt to be a good compromise. The light weight and simplicity of stem end cap 53 is believed to justify any occasional need for stabilization.

Figure 7:
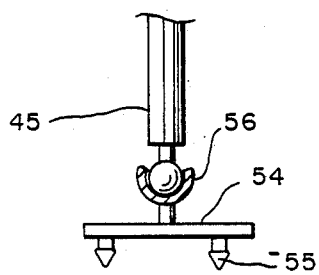
Figure 8:
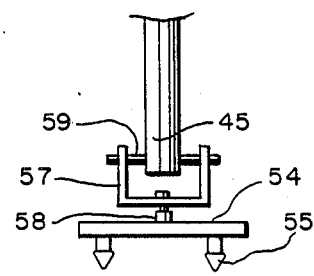

Some users may, however, prefer that end 45 be designed to positively grip the ground so as to require no stabilization. A shoe 54 with ground engaging spikes 55 would fulfill this desire. A ball and socket universal joint 56, for example, could be incorporated onto shoe 54 to provide free rotation of end 45. (FIG. 7) Or, a lower clevis 57 mounted rotatably about a vertical pin 58, with a cross pin 59 engaging end 45, would fulfill the minimum rotation requirements. (FIG. 8) In another variation, upper clevis 18 could be mounted pivotally to top stem cap 24, with lower clevis 57 then mounted unrotatably upon shoe 54. Numerous other changes, substitutions and alterations may be made to the illustrated embodiments of shovel lifting aid 10 without departing from the essential characteristics of the invention.

For example, aid 10 would still relieve the back of bending without the provisions for free rotation of shovel 12 about the length of its handle 11. In this event, shovel head 13 would be emptied by lifting stem 16 from the ground and rotating it along with shovel 12 to dump the soil. With stem 16 constructed of very lightweight aluminum tubing, for example, such a procedure might be acceptable to many.

The addition of one of a pair of wheels 60 attached to stem 16 permits soil 44 to be easily moved considerable distances before it is unloaded. (FIG. 19) After shovel 12 is raised to hip height, stem 16 is tilted further rearwardly onto wheel 60. Bracket 61 is preferably removably secured to stem 16, so that the use of wheel 60 is optional. A support 62 may be provided to stabilize handle 11 with stem 16 during transport.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. An attachment for a shovel, or a like tool, having a material handling head and an elongate handle having a longitudinal axis, the attachment comprising:
   an elongate stem extending vertically downward from the handle to the vicinity of the ground when the tool is oriented with the head in normal shoveling position;
   pivot means providing pivotal movement about two different axes connecting the uppermost end of the stem directly to the handle, said uppermost end pivot connecting means permitting the handle to pivot up and down to provide a lifting motion in a plane containing the stem, and to be twisted about said longitudinal axis with respect to the stem to provide a dumping motion; and
   ground contacting means carried by the stem at its lowermost end, said ground contacting means permitting rotation of the stem about its lowermost end with respect to the ground at least about each of a pair of mutually perpendicular horizontal axes.

2. The attachment of claim 1, wherein:
   the connection means permits rotation of the handle about an axis aligned with the length of the stem.

3. The attachment of claim 1, wherein the ground contacting means comprises:
   a cap carried by the lowermost end of the stem.

4. The attachment of claim 1, wherein the uppermost end pivot connecting means comprises:
   a clevis secured to the end of the stem, the arms thereof extending outwardly from the stem and parallel thereto;
   an open ended outside cylindrical sleeve mounted upon and between the clevis arms pivotally about an axis transverse thereto;
   an open ended inside cylindrical sleeve secured within the outside sleeve to rotate coaxially with respect thereto; and
   clamping means carried by the inside sleeve securing the handle of the shovel therewithin.

5. The attachment of claim 1, further comprising:
   wheel means having generally horizontal axle means, and secured to the stem offset therefrom, so as to bear upon the ground when the stem is tilted therefowards from vertical position.

6. The attachment of claim 1, wherein:
   the ground contacting means permits the stem to be freely twisted about its length with respect to the ground.

7. The attachment of claim 6, wherein the ground contacting means comprises:
   a cap carried by the lowermost end of the stem.

8. The attachment of claim 6, further comprising:
   wheel means having generally horizontal axle means, and secured to the stem offset therefrom, so as to bear upon the ground when the stem is tilted therefowards from vertical position.

9. The attachment of claim 6, wherein the connecting means comprises:
   a clevis secured to the end of the stem, the arms thereof extending outwardly from the stem and parallel thereto;
   an open ended outside cylindrical sleeve mounted upon and between the clevis arms pivotally about an axis transverse thereto;
   an open ended inside cylindrical sleeve secured within the outside sleeve to rotate coaxially with respect thereto; and
   clamping means carried by the inside sleeve securing the handle of the shovel therewithin.

10. The attachment of claim 9, further comprising:
    wheel means having generally horizontal axle means, and secured to the stem offset therefrom, so as to bear upon the ground when the stem is tilted therefowards from vertical position.

* * * * *